United States Patent
McCaw

(10) Patent No.: US 7,113,963 B1
(45) Date of Patent: Sep. 26, 2006

(54) OPTIMIZED DATABASE TECHNIQUE TO ENABLE FASTER DATA SYNCHRONIZATION

(75) Inventor: Kelly Robert McCaw, San Jose, CA (US)

(73) Assignee: Palmsource, Inc., Sunnyvale, CA (US)

( * ) Notice: Subject to any disclaimer, the term of this patent is extended or adjusted under 35 U.S.C. 154(b) by 131 days.

(21) Appl. No.: 09/710,605

(22) Filed: Nov. 10, 2000

(51) Int. Cl.
 *G06F 12/00* (2006.01)
 *G06F 15/16* (2006.01)

(52) U.S. Cl. ............................ 707/204; 707/8; 709/248

(58) Field of Classification Search ........ 707/200–204, 707/2, 101, 1–10, 100–12, 104.1; 709/201, 709/205, 224, 227, 248; 9/201, 224
See application file for complete search history.

(56) References Cited

U.S. PATENT DOCUMENTS

| | | | | |
|---|---|---|---|---|
| 5,392,390 A | * | 2/1995 | Crozier ........................ | 345/762 |
| 5,649,195 A | * | 7/1997 | Scott et al. .................. | 707/201 |
| 5,884,328 A | * | 3/1999 | Mosher, Jr. .................. | 707/202 |
| 6,044,381 A | * | 3/2000 | Boothby et al. ............. | 707/201 |
| 6,275,831 B1 | * | 8/2001 | Bodnar et al. ............... | 707/201 |
| 6,295,541 B1 | * | 9/2001 | Bodnar et al. ............... | 707/203 |
| 6,466,951 B1 | * | 10/2002 | Birkler et al. ................ | 707/201 |
| 6,487,560 B1 | * | 11/2002 | LaRue et al. ................. | 707/203 |
| 6,516,327 B1 | * | 2/2003 | Zondervan et al. .......... | 707/200 |
| 6,532,480 B1 | * | 3/2003 | Boothby ....................... | 707/201 |
| 6,549,917 B1 | * | 4/2003 | Pollard et al. ............... | 707/201 |
| 6,643,669 B1 | * | 11/2003 | Novak et al. ................ | 707/201 |
| 6,647,508 B1 | * | 11/2003 | Zalewski et al. ............. | 714/3 |
| 6,694,337 B1 | * | 2/2004 | King et al. ................... | 707/201 |
| 6,820,088 B1 | * | 11/2004 | Hind et al. ................... | 707/101 |

* cited by examiner

*Primary Examiner*—John R. Cottingham
*Assistant Examiner*—Miranda Le
(74) *Attorney, Agent, or Firm*—Berry & Associates P.C.

(57) ABSTRACT

Method and system that enables faster data synchronization between different databases. In one embodiment, a method for synchronizing data records between databases is provided. Initially, a first database is designated as a source database and a second database as a target database. The modification flag of a first data record in the source database is examined. If the first modification flag is set, the first data record is propagated to the target database. On the other hand, if the first modification flag is not set, a first modification count of the first data record is compared with a second modification count of a corresponding data record in the target database. In this embodiment, each of the modification counts is a value indicating how many times the respective data record has been modified. If it is determined that the first modification count has a higher value than the second modification count, the corresponding data record is updated according to the first data record. Importantly, the method of this embodiment can be carried out as described without comparing the raw data of the data records. As such, this embodiment of the present invention advantageously eliminates the record-by-record comparison that is inherent in the prior art synchronization process and the inconvenience associated therewith and provides an efficient data synchronization technique that can be beneficially utilized in numerous applications.

18 Claims, 9 Drawing Sheets

50

OPTIMIZED DATABASE TECHNIQUE TO ENABLE FASTER DATA SYNCHRONIZATION

BACKGROUND OF THE INVENTION

1. Field of the Invention

The present invention relates to database design. More specifically, the present invention pertains to a method and system that enables faster data synchronization between different databases.

2. Related Art

Computer systems and other electronic devices have become integral tools that are used extensively to perform a wide variety of useful operations in modern society. Applications of computer systems can be found in virtually all fields and disciplines, including but not limited to business, industry, scientific research, education and entertainment. For instance, computer systems are used to analyze financial data, to control industrial machinery, to model chemical molecules, to deliver classroom presentations and to generate special effects for movies. Moreover, computer systems along with other electronic devices are finding new applications as a result of advances in hardware technology and rapid development in software technology. The growing affordability of computer systems and electronic devices together with the abundance of useful new applications have fueled strong demand for such systems and devices.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the PDA. A PDA is a portable computer system which is small enough to be held conveniently and comfortably in the hand of its user. In particular, a popular size for the typical PDA approximates the size of a palm.

The PDA is usually a battery-powered device that is typically used as an electronic organizer having the capability to store and display a wide range of information which can include numerous addresses and telephone numbers of business and personal acquaintances, financial information, daily appointments, along with various other personal information. As such, the PDA is able to consolidate a wide variety of information and make the information easily accessible by its user. Therefore, PDAs are very useful and have gained wide popularity.

PDAs usually has a built-in database (e.g., as part of the system software) for storing the wide variety of information as described above. Moreover, PDAs typically have the capability to communicate information with another system, such as to a desktop computer system via a cradle. In many cases, the desktop computer system also store the same kind of information as the PDA with which it communicates in its own database. In between instances of such data communications, the information on either the PDA's or the desktop computer system's database may have been changed (e.g., updates, additions, deletions) by the user. It is also possible that information in both databases have been modified. For example, a user may have added a new entry into the address book of the PDA, and that particular addition has not yet been made to the desktop system's database. Under such circumstances, when the PDA and the desktop system engage in a communication session, data synchronization between the two databases needs to be performed so that the correct information is propagated to both databases.

Currently, some PDAs employ two different modes of synchronization, namely: a slow sync mode and a fast sync mode. According to this implementation, a fast sync is applicable only in a limited number of situations, such as during the first synchronization after a database has been modified. In a subsequent synchronization with a different database, such as a database on a different desktop system, a fast sync is not appropriate and a slow sync is required.

As their names indicate, a slow sync requires more time to complete than a fast sync. This is because while a fast sync simply works on data records that are marked as modified, a slow sync performs a record-by-record comparison for the entire database. Indeed, a slow sync takes up an incrementally longer time period to complete as the size of the database (e.g., measured by the number of data records) that needs to be synchronized increases. As such, it can be an inconvenience to users, especially those who frequently need to synchronize their hand-held device with multiple desktop systems, which typically include a home computer and an office computer. As hand-held computer technology advances and its applications multiply, an increasing number of users utilize hand-held computers and PDAs to store information which eventually needs to be stored in a desktop system, or as a conduit to propagate information between different systems or devices. Therefore, it would be advantageous to come up with a technique that can speed up the rate of data synchronization in situations where a slow sync would have been required under the existing approach.

Another shortcoming of the two-mode data synchronization approach, where fast sync is used in some cases and slow sync in others, is that it necessitates extra programming for developers of applications for PDAs. In particular, since different sync modes are needed under different scenarios, developers need to incorporate program code in PDA applications for determining which sync mode to use in a given situation. Such a requirement is undesirable because the extra program code could prolong the development cycle and introduce added complexity to the applications. Thus, it would be beneficial to provide an approach for data synchronization which is efficient in terms of speed and which does not employ multiple modes of synchronization depending on the particular situation.

SUMMARY OF THE INVENTION

It would be advantageous to provide a method and system for data synchronization that does not require a long time period to complete. Furthermore, it would also be advantageous for such method and system not to introduce extra complexity into development efforts such that application development cycles would not be adversely affected.

Accordingly, the present invention provides a method and system that enables faster data synchronization between different databases. More particularly, embodiments of the present invention eliminate the need to perform record-by-record comparison of all data records in the databases being synchronized. The lengthy synchronization process inherent in the prior art slow sync approach and the inconvenience associated therewith is thus advantageously eliminated. Moreover, since embodiments of the present invention are capable of handling data synchronization irrespective of whether an earlier synchronization has been performed, the need for a dual-mode (e.g., fast sync and slow sync) synchronization approach is beneficially eliminated. As such, the complexity of application development is greatly reduced, thereby simplifying the job for application developers. Thus, the present invention provides a superior approach to data synchronization over the prior art. These and other advantages of the present invention not specifically mentioned above will become clear within discussions of the present invention presented herein.

More specifically, in one embodiment of the present invention, a method for synchronizing data records between databases is provided. Initially, a first database is designated as a source database and a second database as a target database. The modification flag of a first data record in the source database is examined. If the first modification flag is set, the first data record is propagated to the target database. On the other hand, if the first modification flag is not set, a first modification count of the first data record is compared with a second modification count of a corresponding data record in the target database. In this embodiment, each of the modification counts is a value indicating how many times the respective data record has been modified. If it is determined that the first modification count has a higher value than the second modification count, the corresponding data record is updated according to the first data record. Importantly, the method of this embodiment can be carried out as described without comparing the raw data of the data records. As such, this embodiment of the present invention advantageously eliminates the record-by-record comparison that is inherent in the prior art synchronization process and the inconvenience associated therewith and provides an efficient data synchronization technique that can be beneficially utilized in numerous applications.

In a specific embodiment, the present invention includes the above and wherein the first database and the second database reside in different host systems. In a currently preferred embodiment, the first database resides in a personal digital assistant (PDA). In one embodiment, the PDA runs on the PalmOS. Furthermore, in another embodiment, the second database resides in a computer system to which a PDA can be coupled via a cradle device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, an optimized database technique that enables efficient data synchronization, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "examining", "propagating", "comparing", "updating", "incrementing" or the like, refer to the action and processes of a computer system (e.g., FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 5:
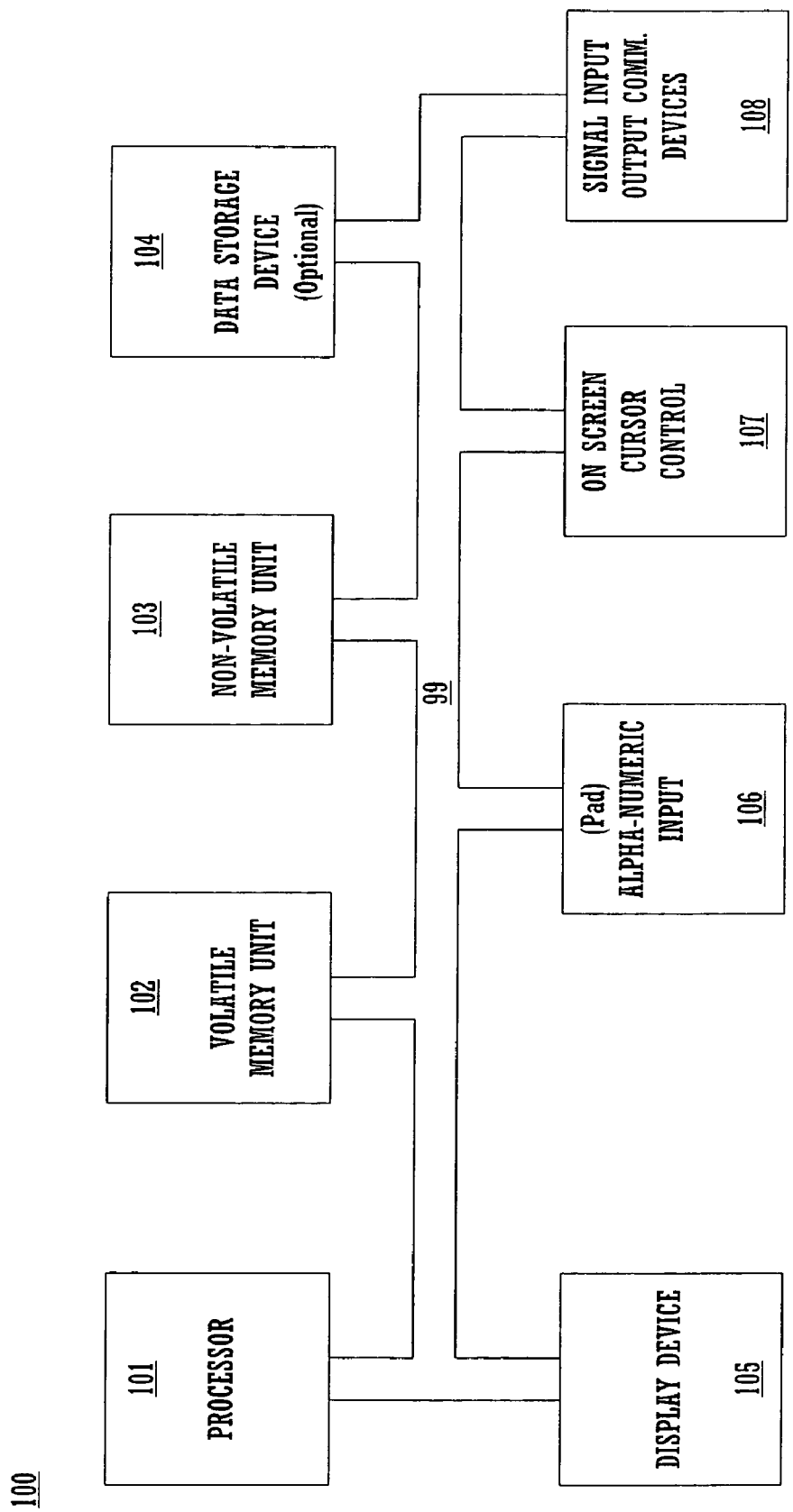
FIG. 5 is a logical block diagram of circuitry located within the exemplary personal digital assistant computer system of FIG. 2A.

Aspects of the present invention, described below, are discussed in terms of steps executed on a computer system. These steps (e.g., process 800) are implemented as program code stored in computer readable memory units of a computer system and are executed by the processor of the computer system. Although a variety of different computer systems can be used with the present invention, an exemplary personal digital assistant computer system is shown in FIG. 5 further below.

Figure 1:
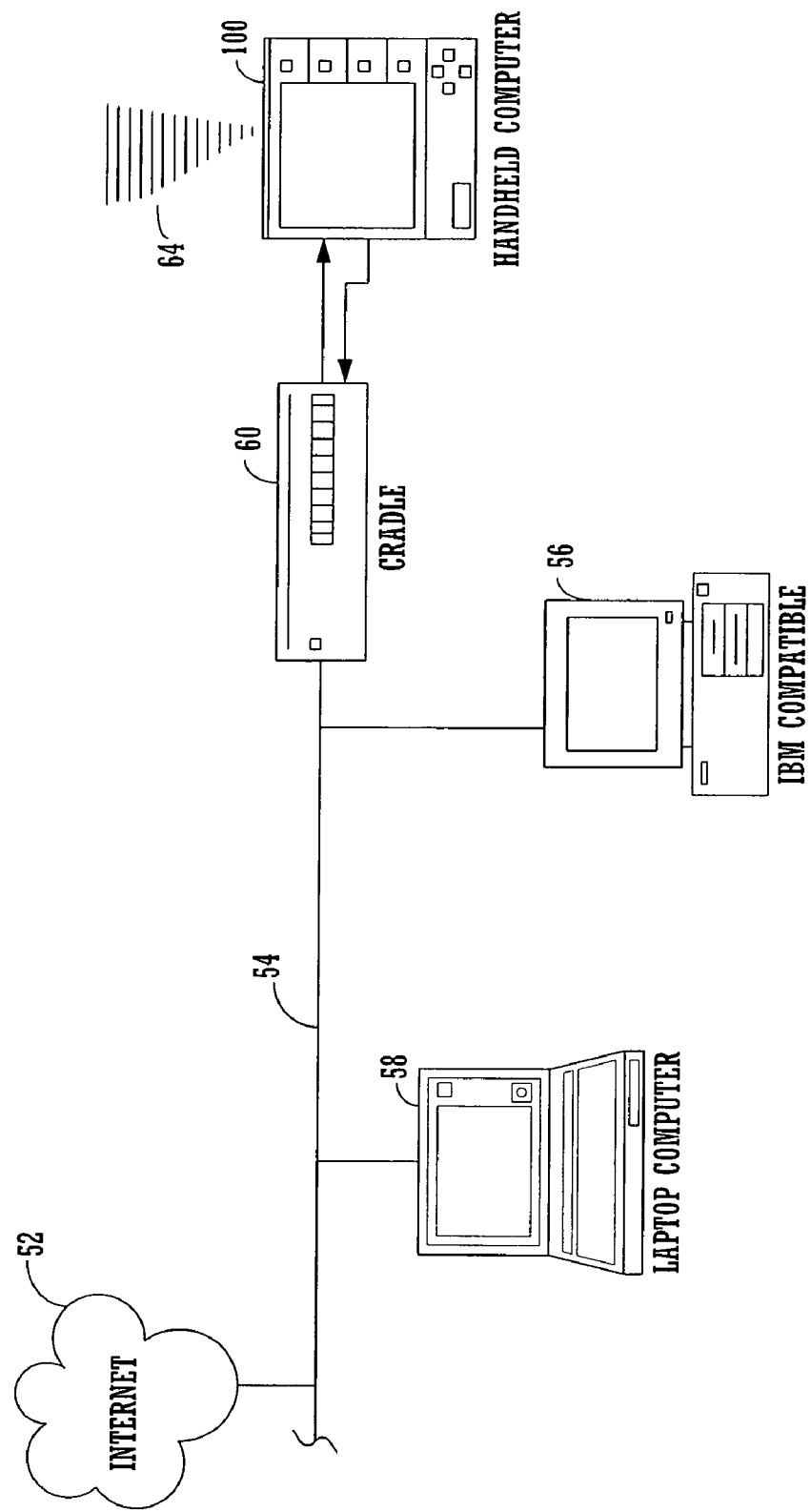
FIG. 1 is a system illustration of an exemplary personal digital assistant computer system connected to other computer systems and the Internet via a cradle device.

An Illustrative Computer System Environment within which Embodiments of the Present Invention can be Practiced Referring now to FIG. 1, a system 50 that can be used in conjunction with the present invention is shown. It is appreciated that the method and system for synchronizing data records between databases of the present invention can be used in conjunction with any computer system and that system 50 is illustrative rather than limiting. It is further appreciated that the portable computer system 100 described below is only exemplary. System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant computer system 100. Cradle 60 provides an electrical and mechanical communication interface between bus 54 (and anything coupled to bus 54) and computer system 100 for two way communications. Computer system 100 also contains a wireless infrared communication mechanism 64 for sending and receiving information from other devices. Within the scope of the present invention, data records stored in a database residing in computer system 100 can be synchronized, in a highly efficient manner, with data records stored in a different database, such as one residing in desktop computer system 56 or laptop computer system 58. A more detailed description of the structure of an illustrative implementation of computer system 100 and its operation in conjunction with a method for synchronizing data records between databases in accordance with one embodiment of the present invention is presented further below with reference to FIGS. 6 and 7.

Figure 2A:
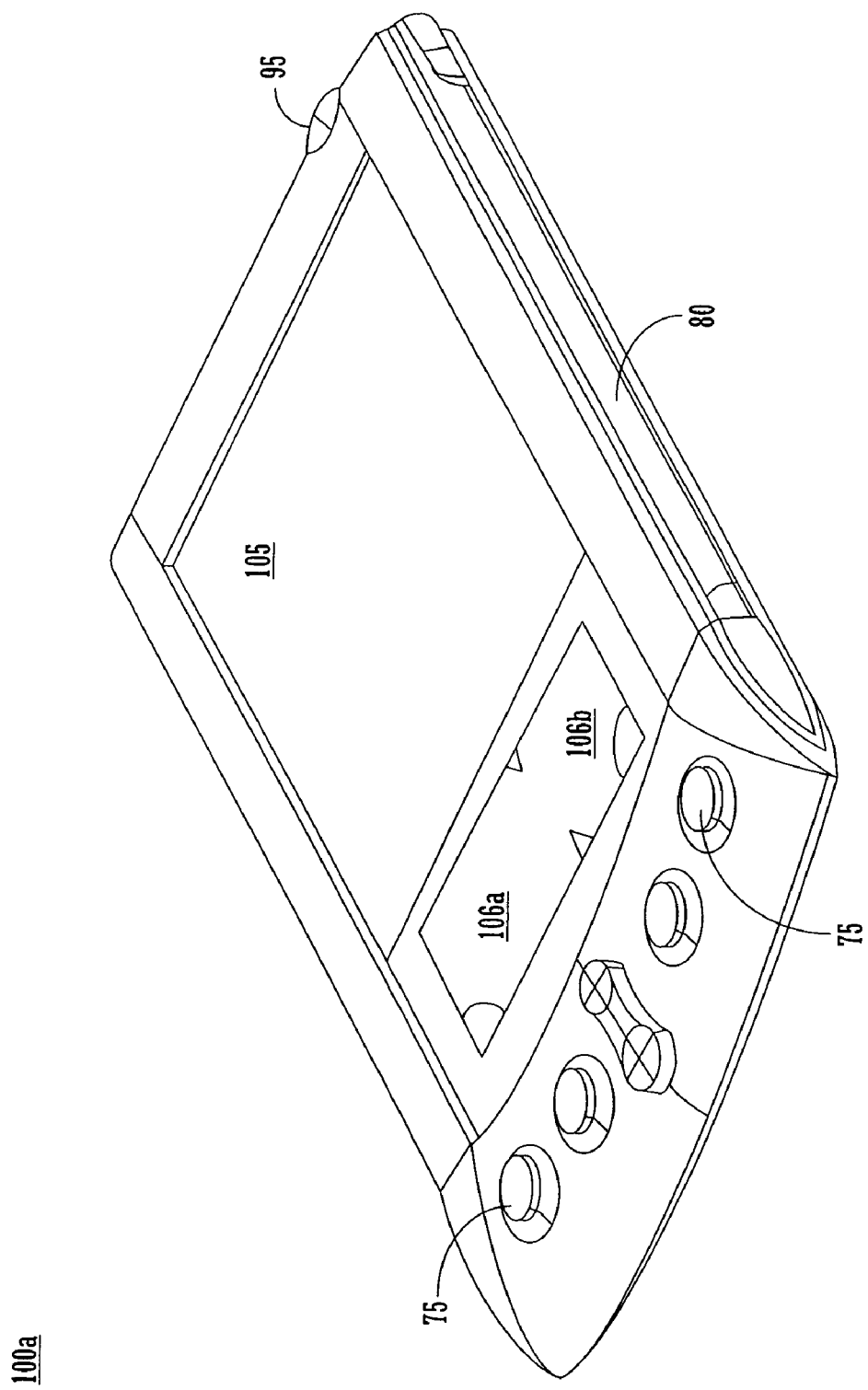
FIG. 2A is a top side perspective view of an exemplary personal digital assistant computer system.

With reference to FIG. 2A, a perspective illustration of the top face 100a of exemplary personal digital assistant computer system 100 is shown. Top face 110a contains a display screen 105 surrounded by a bezel or cover. A removable stylus 80 is also shown. Display screen 105 is a touch screen capable of registering contact between the screen and the tip of stylus 80. Stylus 80 can be fabricated of any material which can make contact with screen 105. Top face 100a also contains one or more dedicated and/or programmable buttons 75 for selecting information and causing computer system 100 to implement functions. An on/off button 95 is shown as well.

Referring still to FIG. 2A, a handwriting recognition pad or "digitizer" containing regions 106a and 106b is also shown. Specifically, region 106a is for the drawing of alpha characters therein for automatic recognition and region 106b is for the drawing of numeric characters therein for automatic recognition. Stylus 80 is used for stroking a character within one of the regions 106a and 106b. The stroke information is then fed to an internal processor for automatic character recognition. Once characters are recognized, they are typically displayed on screen 105 for verification and/or modification.

Figure 2B:
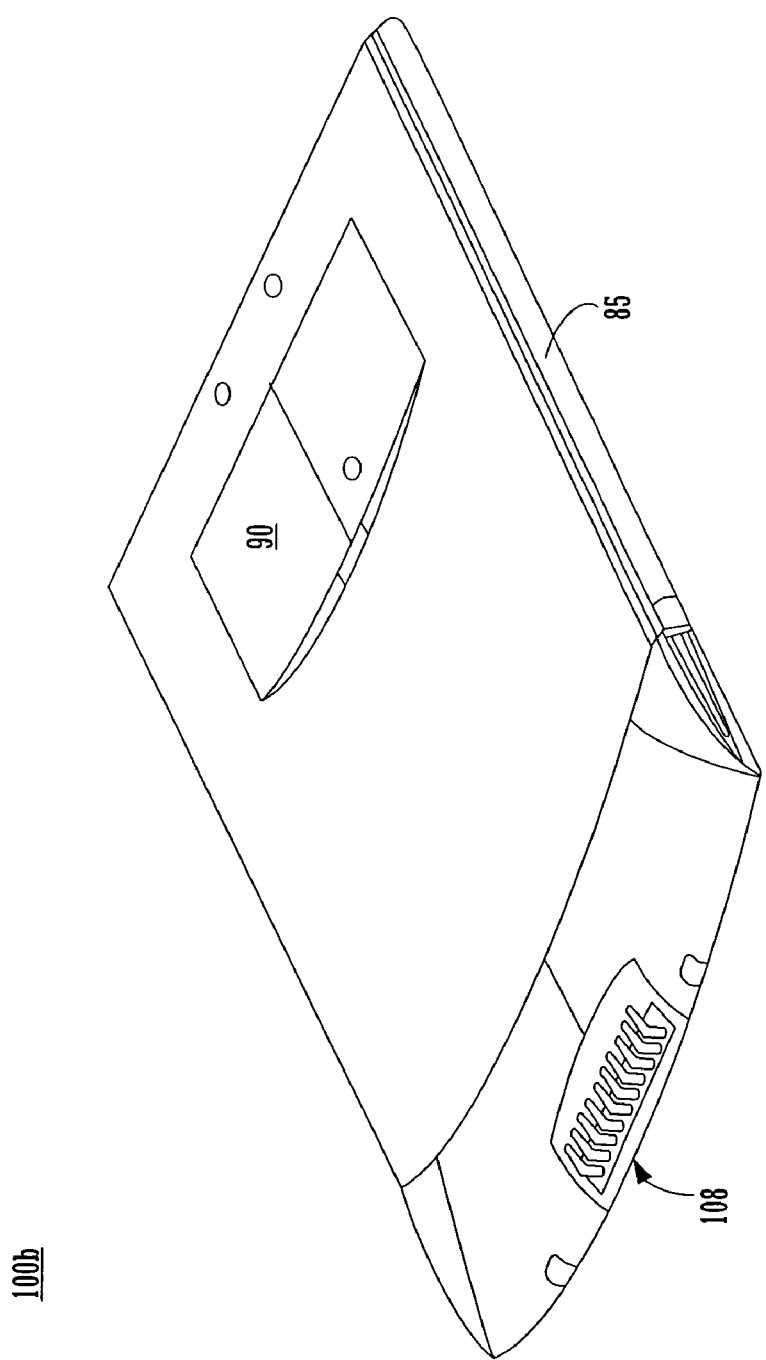
FIG. 2B is a bottom side perspective view of the personal digital assistant computer system of FIG. 2A.

FIG. 2B illustrates the bottom side 100b of one embodiment of personal digital assistant computer system 100. An optional extendible antenna 85 is shown, and a battery storage compartment door 90 is shown as well. A communication interface 108 is also shown. In one embodiment of the present invention, the serial communication interface 108 comprises a serial communication port, but it could also alternatively be of any of a number of well known communication standards and protocols, e.g., parallel, small computer system interface (SCSI), Ethernet, Firewire (IEEE 1394), etc.

Figure 3:
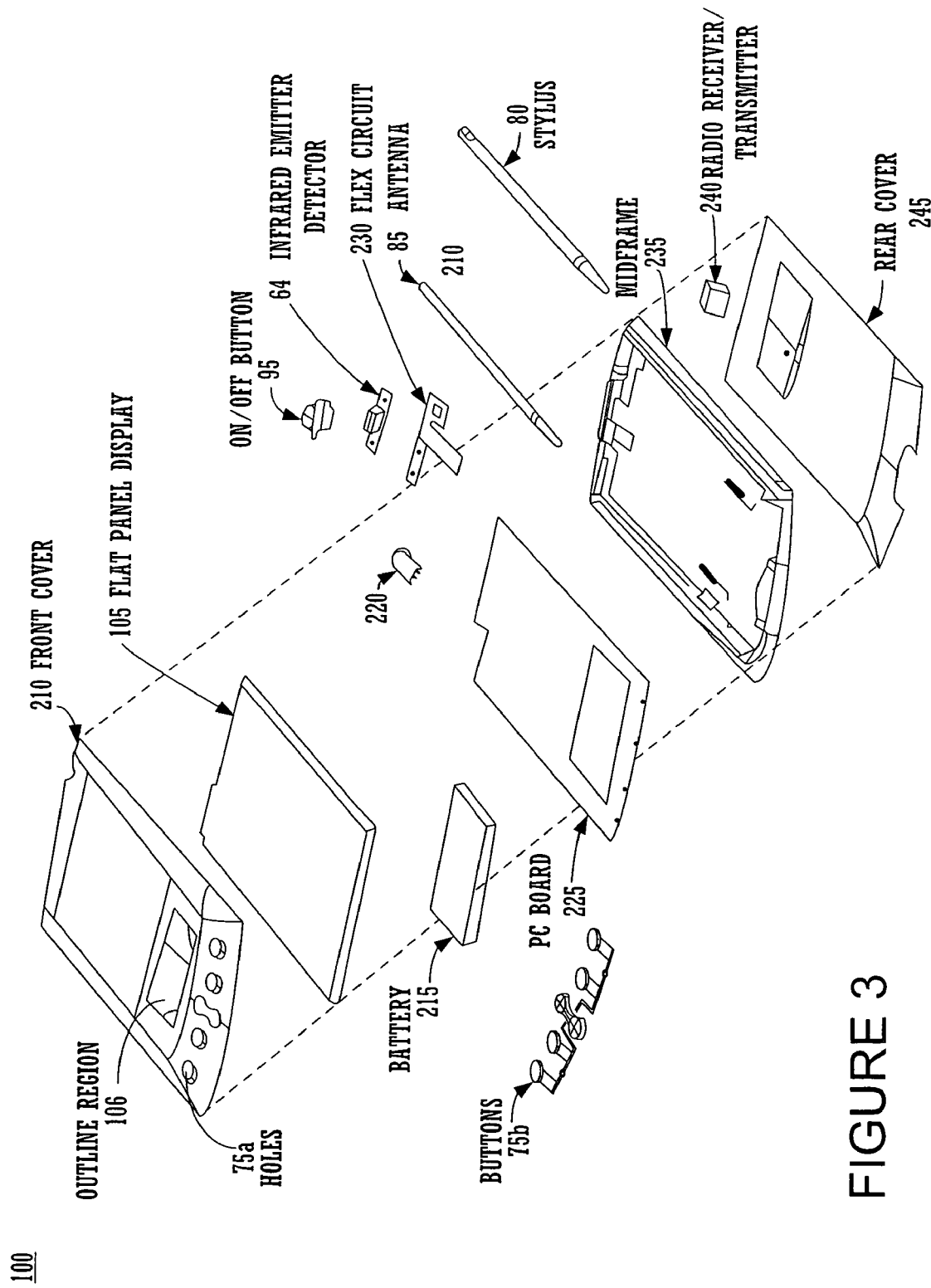
FIG. 3 is an exploded view of the components of the exemplary personal digital assistant computer system of FIG. 2A.

With reference now to FIG. 3, an exploded view of the exemplary personal digital assistant computer system 100 is shown. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission device (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is also shown.

Additionally, a radio receiver/transmitter device 240 is also shown between the midframe and the rear cover 245 of FIG. 3. Radio receiver/transmitter device 240 is coupled to antenna 85 and also coupled to communicate with PC board 225. In one implementation, the Mobitex wireless communication system is used to provide two way communication between system 100 and other networked computers and/or the Internet via a proxy server.

Figure 4:
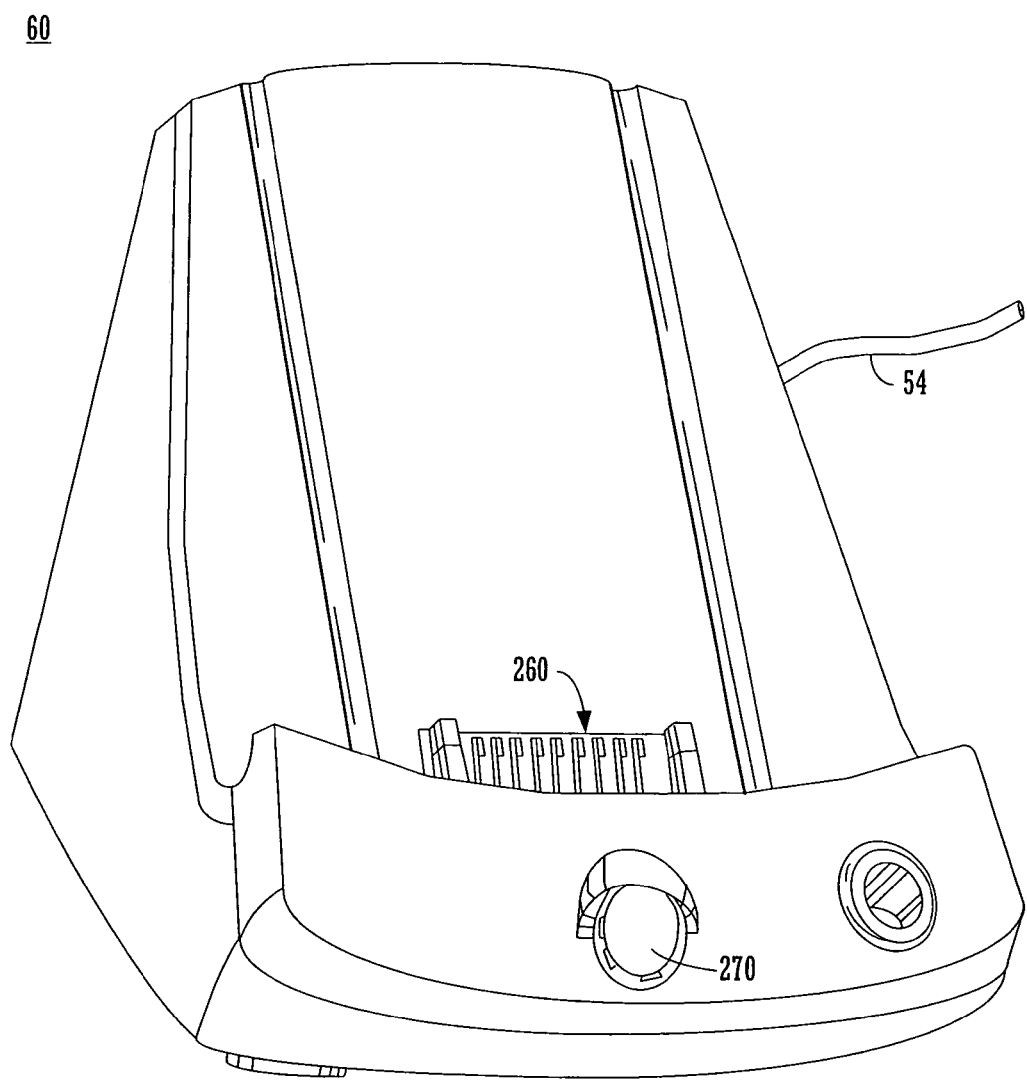
FIG. 4 is a perspective view of the cradle device for connecting the personal digital assistant computer system to other systems via a communication interface.

FIG. 4 is a perspective illustration of one embodiment of the cradle 60 for receiving the personal digital assistant computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication bus 54.

Referring now to FIG. 5, a block diagram of exemplary personal digital assistant computer system 100 is shown. Some of the modules shown in FIG. 5 can be implemented on PC board 225. Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. As described above, computer system 100 also contains a display device 105 coupled to bus 99 for displaying information to the computer user. PC board 225 can contain processor 101, bus 99, volatile memory unit 102, and non-volatile memory unit 103. As described further below, portions of memory units 102 and 103 can be removed from computer system 100. Moreover, computer system 100 can also include an optional data storage device 104 (e.g., memory stick) for storing information and instructions. In one embodiment, optional data storage device 104 is removable from computer system 100.

In a currently preferred embodiment, one or more database(s) reside in a memory unit of computer system 100, such as memory units 102 and 103. In an alternative embodiment, such database(s) reside in optional data storage device 104. In accordance with embodiments of the present invention, data records stored in any of these databases can be efficiently synchronized with those stored in another database, which can reside in a different computer system, as described further below with reference to FIGS. 6 and 7.

Also included in computer system 100 of FIG. 5 is an optional alphanumeric input device 106 which, in one implementation, is a handwriting recognition pad ("digitizer") having regions 106a and 106b (FIG. 2A), for instance. Device 106 can communicate information and command selections to central processor 101. Computer system 100 also includes an optional cursor control or directing device 107 coupled to bus 99 for communicating user input information and command selections to central processor 101. In one implementation, device 107 is a touch screen device incorporated with screen 105. In this implementation, device 107 is capable of registering a position on screen 105 where a stylus makes contact. Display device 105 utilized with computer system 100 may be a liquid crystal device (LCD), cathode ray tube (CRT), field emission device (FED, also called flat panel CRT) or other display device suitable for creating graphic images and alphanumeric characters recognizable to the user. In a currently preferred embodiment, display 105 is a flat panel display. Computer system 100 also includes signal communication interface 108, which is also coupled to bus 99, and can be a serial port for communicating with cradle 60. Communication interface 108 can also include an infrared communication mechanism.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 6:
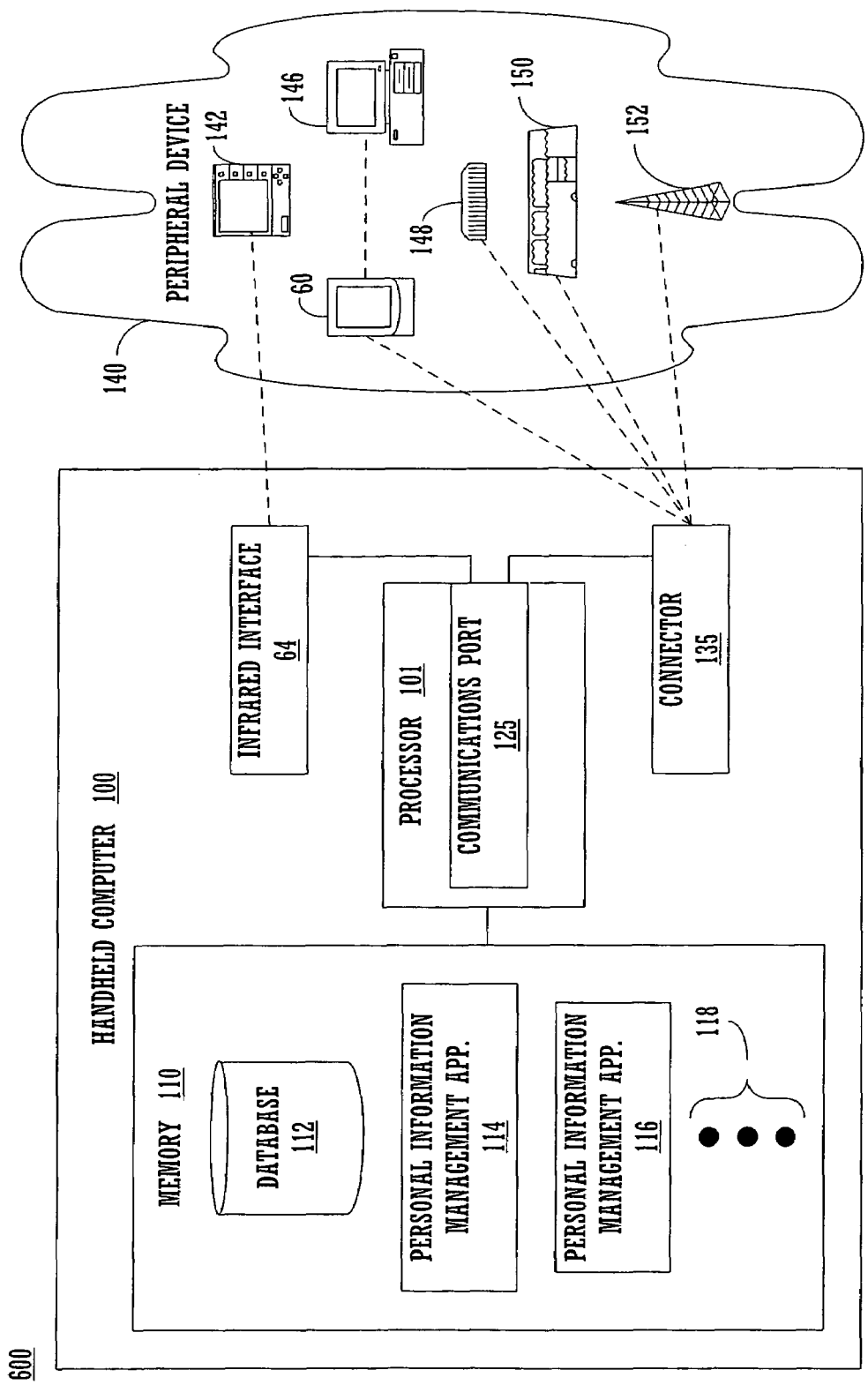
FIG. 6 is a block diagram of a system practicing data synchronization in accordance with one embodiment of the present invention.

Referring next to FIG. 6, a block diagram is shown of a system 600 practicing data synchronization in accordance with one embodiment of the present invention. System 600 includes a hand-held computer 100 and another computer system 140 or an interface communicatively coupled thereto. Example embodiments of the hand-held computer 100 include various models of the Palm hand-held organizers, as well as numerous other hand-held computers running a version of the Palm operating system, or PalmOS. Additional embodiments include other hand-held computers, such as those running a version of Microsoft's Windows CE operating system and those running a version of the EPOC operating system, as well as set-top boxes. Similarly, examples of computer system 140 include the same examples mentioned previously for computer 100, along with other hardware modules or interfaces not specifically mentioned herein.

As illustrated in FIG. 6, hand-held computer 100 includes a memory 110 (e.g., volatile memory unit 102, non-volatile memory unit 103 of FIG. 5) and processor 101. Memory 101 can store various programs, or sequences of instructions for execution by processor 101, as well as other information and data. Example programs shown include a database 112 and personal information management (PIM) applications 114 and 116, such as an address book, a daily organizer and electronic notepads, to name a few. Other programs 118 can include programs for carrying out other internal functions of hand-held computer 100, or for carrying out functions relating to interfacing with computer system 140. Some of the programs may be included in device drivers, the operating system, and/or applications.

In a currently preferred embodiment, hand-held computer 100 further includes infrared interface 64 and a connector 135, and processor 101 includes a communications port 125. In this embodiment, communication interface 108 (FIG. 1) of computer 100 comprises infrared interface 64, communications port 125, and connector 135. Hand-held computer 100 communicates with computer system 140 via one or more communications ports 125. In one embodiment, processor 101 is a DragonBall processor manufactured by Motorola, Inc. For example, the Palm IIIx and Palm V hand-held computers use a DragonBall processor model known as the DragonBall EZ MC68EZ238 Integrated Microprocessor. Other embodiments use different microprocessors. An embodiment implemented using the DragonBall EZ processor has a communications port 125 that includes one serial port, while other embodiments of the present invention can include multiple serial ports, one or more parallel port(s), or other configurations.

In accordance with embodiments of the present invention, hand-held computer 100 communicates with computer system/communication interface 140 via a wired or wireless connection. An example of a wireless connection is a communication link between two hand-held computers 100 and 142 carried out in infrared through infrared interface 64 coupled to communications port 125. In infrared communication, an infrared transceiver included in infrared interface 64 of hand-held computer 100 communicates with the infrared transceiver of another hand-held computer 142. In one embodiment, the transceivers follow an IrDA (Infrared Data Association) protocol. In other embodiments, other protocols are used.

An example of a wired connection is a communication link between hand-held computer 100 and a keyboard 150 through connector 135. Another example of a wired connection is a communication link between hand-held computer 100 and cradle 60, through connector 135 coupled to communications port 125. This is a configuration that is often used to synchronize data between hand-held computer 100 and another computer 146 (e.g., desktop computer 56 or laptop computer 58 of FIG. 1). In particular, in a currently preferred embodiment, the data synchronization method of the present invention is practiced with hand-held computer 100 being coupled to computer 146 via cradle 60, where one of the databases to be synchronized resides in hand-held computer 100 and the other resides in computer 146.

Within the scope of the present invention, in addition to the devices mentioned above, computer system/communication interface 140 can also be a modem 148, devices for cellular or personal communication services, other wireless devices 152 including radio, infrared, and acoustic communication peripherals, as well as Bluetooth devices. Information on the Bluetooth communication specification is not described herein but is available on the Internet at the address http://www.bluetooth.com.

Figure 7:
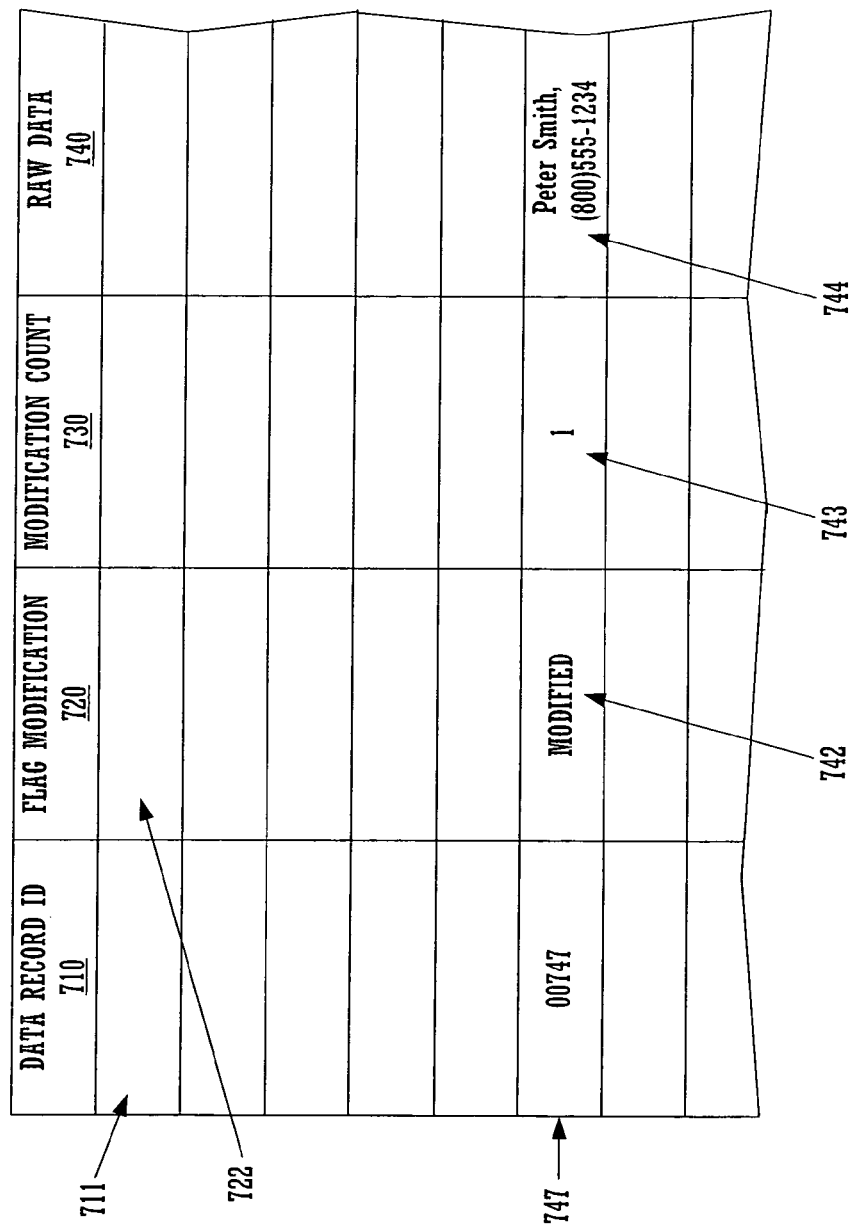
FIG. 7 illustrates an exemplary database layout in accordance with one embodiment of the present invention.

Exemplary Database Layout in Accordance with One Embodiment of the Present Invention Referring next to FIG. 7, an exemplary database layout in accordance with one embodiment of the present invention is illustrated in the form of a database table 700. In one embodiment, database table 700 is stored in database 112 which resides in memory 110 of hand-held computer 100 as described with reference to FIG. 6 above. In FIG. 7, four columns are shown in table 700. On the other hand, the number of rows is determined by the number of data records stored in table 700. As illustrated, column 710 is for storing data record IDs, column 720 for modification flags, column 730 for modification counts, and column 740 for raw data.

Given this table layout, a cell at the intersection of a column and a row stores a particular attribute of a certain data record. For example, cell 711 is for storing the data record ID of a particular data record, while cell 722 is for storing the modification flag of another data record. In another embodiment, raw data of a data record is classified into different categories or fields which are then stored in separate columns. For instance, in a database for an address book application, the raw data of a data record can include a contact name, one or more phone numbers, one or more addresses, and electronic mail addresses, among others. Each piece of information in this case can logically be stored in a separate column within the scope of the present invention.

It is appreciated that table 700 can include additional columns which are not shown in FIG. 7. Such additional columns may be necessary for storing other data or information not specifically described herein and not required in order to practice the present invention. The number of such additional columns, if any, and their format (e.g., data types) is dependent upon the particular design of the database in question. Thus, although not expressly shown in FIG. 7, such alternative embodiments and variations are within the scope and spirit of the present invention.

In a currently preferred embodiment, each data record in a database has a data record ID that uniquely identifies the particular data record from among others in the database. Column 710 as described above is used to store these data record IDs. In this embodiment, each data record also has an associated modification flag, which is stored in column 720. Within the present invention, this flag can take on one of several possible value at any given time, which value serves to indicate the modification status of the data record. In one embodiment wherein the database runs on the PalmOS, possible values for the modification flag include "new," "modified," "deleted" and "archived," among others. In this embodiment, "new" indicates that since the last data synchronization has taken place, the data record has been newly created or added to the database. "Modified" simply means that the data record has since been modified or updated. "Deleted" means that the data record has been deleted and should no longer be listed as a current record. "Archived" indicates that the data record is in archive. The modification flag is set accordingly upon the occurrence of the respective events. It is appreciated that such events (e.g., additions, modifications, deletions, archiving) can be performed via manual entry by a user of the computer system or programmatically by application programs running on the computer system.

For example, in one embodiment, when a new data record is being added, its modification flag would be set to "new." Likewise, when an existing data record is being updated, its modification flag would be set to "modified." Thus, the record is marked to indicate that it has been changed since the last synchronization. When a synchronization is performed between this database and another database, the modification flag for each of the data records is checked. Only those records whose flags are set to "modified" or "new" are processed in a first pass. Moreover, once a record has thus been processed in this first pass, its modification flag is cleared. Thus, in a subsequent synchronization with a different database (e.g., a different desktop system), the modification flag alone can no longer be relied upon as a true indication as to whether the particular data record needs to be processed with respect to this other database.

Thus, in a currently preferred embodiment, each data record further includes an associated modification count, which is stored in column 730. Within the present invention, this modification count is a value that indicates how many times a data record has been modified. Thus, the modification count is another indicator of the modification status of the data record. Importantly, in a currently preferred embodiment, the modification count of a data record is an integer value that gets incremented each and every time that data record is modified. Moreover, unlike the modification flag described above, the modification count for a data record is not reset or otherwise cleared when that data record is being processed in a synchronization. Instead, it keeps a running total of the number of times that the specific data record has been modified since its creation. As such, the modification count of a data record is a modification history log that is used by and yet remains unaffected by the synchronization process.

Operation of the Data Synchronization Method in Accordance with One Embodiment of the Present Invention Building upon the foregoing description, an example would best serve to illustrate the operation of the present invention. Suppose a user has updated an entry in the address book database 112 of hand-held computer 100, such as data record 747 of FIG. 7, and that particular update has not been made to the database of desktop system 146. When hand-held computer 100 and desktop system 146 are communicatively coupled (e.g., via cradle 60), data synchronization between the two databases can be performed so that both databases would contain the most up-to-date information. In a currently preferred embodiment practiced upon a Palm compatible device (e.g., a device running on the Palm OS), a HotSync interrupt can be used to initiate the data synchronization process of the present invention.

In accordance with one embodiment of the present invention, when hand-held computer 100 having modified data record 747 (e.g., the updated address book entry) and desktop computer system 146 undergo data synchronization, the modification flags for all data records would initially be examined in a first phase of the synchronization process. At this point, the modification flag for modified record 747 in database 112 would read "modified" (cell 742) and as such the raw data (cell 744) of data record 747 would be propagated (e.g., copied over) to the database in desktop system 146. Moreover, the modification flag for data record 747 in database 112 would be cleared to indicate that data record 747 has been processed in this first phase.

In a currently preferred embodiment, the method of the present invention first checks the modification flags for all data records in the database in hand-held computer 100, and then checks the modification flags for all data records in the database in desktop computer 146. The method of this embodiment then makes the necessary updates to those data record that have been modified, added or deleted based on the status of their modification flags. Thus, in this particular example where one record has been modified in hand-held computer 100, upon completion of the above described steps, the corresponding data record in the database in desktop system 146 would have the same up-to-date raw data as its counterpart in database 112 (data record 747) in hand-held computer 100, which is the data record that has been modified. In other words, the two databases would be properly synchronized after the first phase as described thus far.

Continuing with the above example, when hand-held computer 100 and a second desktop system (not shown in FIG. 6) undergo synchronization afterwards, the modification flag for data record 747 in database 112 is no longer marked as "modified" upon examination, assuming that data record 747 has not been modified again in the meantime. This is because the flag has been cleared during the previous synchronization with system 146 that has occurred prior in time. As such, data record 747 would not be identified as requiring synchronization in the first phase of the synchronization process. Thus, in accordance with the present invention, the modification count of data record 747 comes into play.

More specifically, in accordance with one embodiment of the present invention, when hand-held computer 100 having modified data record 747 and a second computer system undergo data synchronization after hand-held computer 100 has already undergone an earlier synchronization with a different system, the modification counts for corresponding data records in the two databases being synchronized would be compared in a second phase of the synchronization process. In one embodiment, hand-held computer 100 keeps track of the identity of the computer system with which it most recently undergoes synchronization (e.g., by way of an identification number or string). By so doing, this embodiment is able to immediately determine whether hand-held computer 100 last synchronized with the computer with which it is now undergoing synchronization. With this information, it can immediately be decided whether or not the modification flags of the data records in database 112 in hand-held computer 100 are usable (e.g., valid) with respect to the other computer system in the synchronization process.

In the current example, the modification count for data record 747 in database 112 is "1" (cell 743) while the modification count for the corresponding data record in the other database is "0". Thus, based on the difference in the modification counts for the data records, the present embodiment identifies that the records need to be reconciled, despite the fact that the modification flag of data record 747 has been cleared. More particularly, since data record 747 has a higher modification count than its counterpart in the other database, the present embodiment recognizes that the raw data of data record 747 has been modified since the last synchronization between the two databases. Therefore, the present embodiment propagates the change (e.g., copies over) from database 112 in hand-held computer 100 to the database in the other computer system. The modification count for the corresponding data record in the other database is also incremented to reflect the value of the modification count for data record 747. In a currently preferred embodiment, the modification count comparison is performed for all data records in the databases, and the necessary updates are made accordingly. Thus, in the current example where one record has been modified in hand-held computer 100, upon completion of the above described steps, the corresponding data record in the other database would have the same up-to-date raw data as its counterpart in database 112 (data record 747) in hand-held computer 100, and the modification count would have been incremented accordingly as well.

Figure 8:
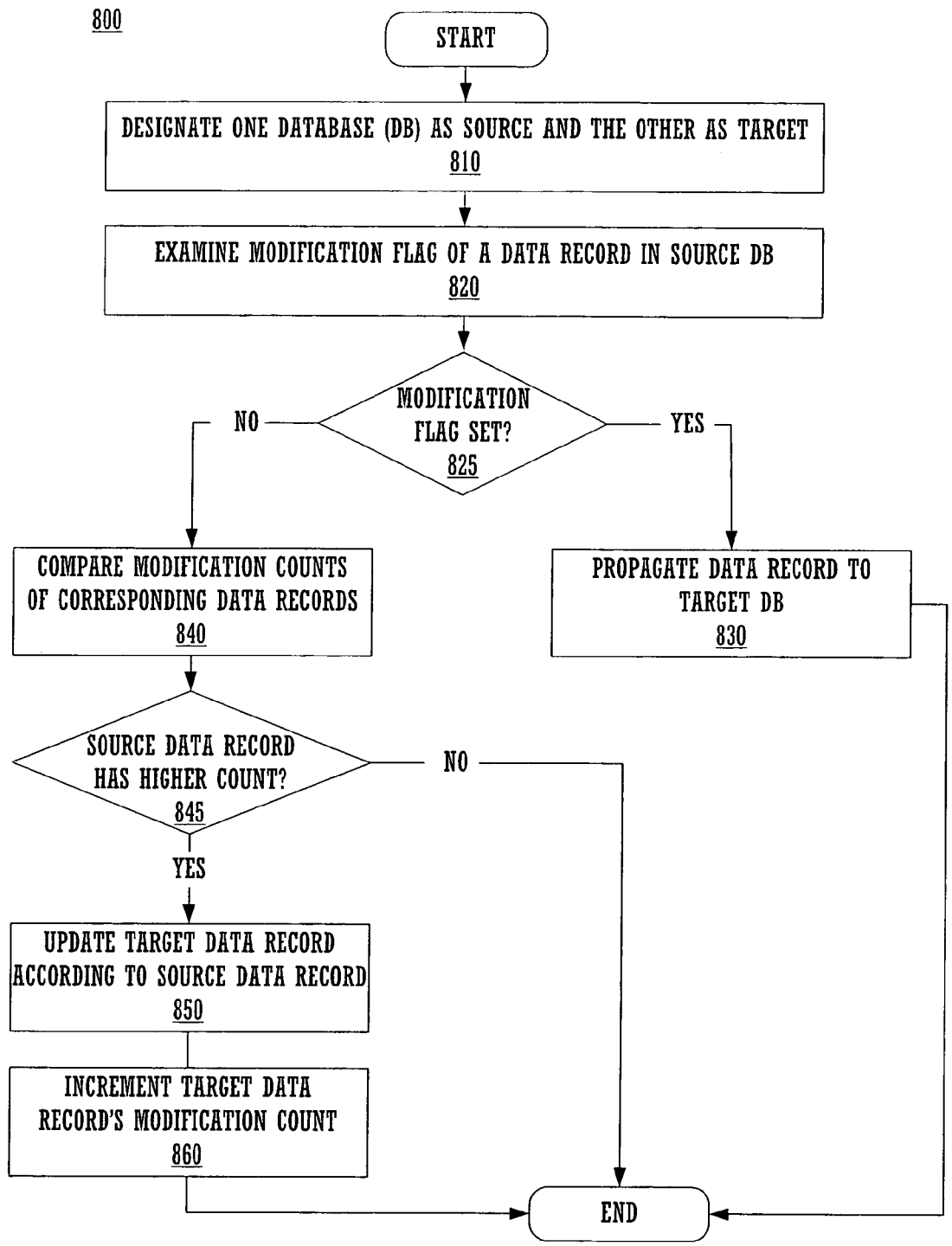
FIG. 8 is a flow diagram illustrating steps for synchronizing data records between different databases in accordance with one embodiment of the present invention.

Referring next to FIG. 8, a flow diagram 800 illustrating steps for synchronizing data records between databases in accordance with one embodiment of the present invention is shown. In step 810, a first database is designated as a source database and a second database as a target database.

In one embodiment, the first database and the second database reside in different host systems. In a currently preferred embodiment, the first database resides in a personal digital assistant (PDA). In one embodiment, the PDA runs on the PalmOS. Furthermore, in another embodiment, the second database resides in a computer system to which a PDA can be coupled via a cradle device.

Referring still to FIG. 8, in step 820, the modification flag of a first data record in the source database is examined.

With reference still to FIG. 8, in step 825, it is determined whether the modification flag of the first data record is set. If the determination is affirmative, then in step 830, the first data record is propagated to the target database.

In one embodiment, propagating the first data record to the target database includes the following. If the first modification flag is set to indicate that the first data record has been modified in the source database and the corresponding data record exists in the target database, then the corresponding data record is updated according to the first data record in the source database and the first modification flag is cleared. If the first modification flag is set to indicate that the first data record is new in the source database and no corresponding data record exists in the target database, then a new data record is created in the target database according to the first data record in the source database and the first modification flag is cleared as well. If the first modification flag is set to indicate that the first data record has been deleted from the source database and the corresponding data record exists and is not already marked as deleted in the target database, then the corresponding data record is marked as deleted in the target database.

Referring still to FIG. 8, if it is determined in step 825 that the modification flag of the first data record is not set, then in step 840, a first modification count of the first data record is compared with a second modification count of a corresponding data record in the target database. In a currently preferred embodiment, each of the modification counts has a value indicating how many times its corresponding data record has been modified.

Referring again to FIG. 8, in step 845, it is determined whether the first modification count has a higher value than the second modification count. If the first modification count has a higher value, then in step 850, the corresponding data record is updated according to the first data record. In accordance with the present invention, steps 810 through 850 can be completed without comparing the raw data of the first data record and the corresponding data record.

With reference again to FIG. 8, in step 860, the second modification count is incremented to the higher value of the first modification count. As such, the present embodiment maintains a running total of the number of times that a specific data record has been modified since its creation using the modification count, which serves as a modification history log that is used by and yet remains unaffected by the synchronization process of the present invention. In one embodiment, steps 810 through 860 are repeated until all of the data records in the source database have been processed. In another embodiment, the source and target databases are reversed and steps 810 through 860 are repeated until all of the data records in the source database have been processed.

Significantly, in accordance with the present embodiment, record-by-record comparison of all data records in the databases being synchronized is not necessary. The lengthy synchronization process inherent in the prior art slow sync and the inconvenience associated therewith is thus advantageously eliminated. Moreover, since embodiments of the present invention are capable of handling data synchronization under all scenarios, the need for a dual-mode (e.g., fast sync and slow sync) synchronization approach is beneficially eliminated. As such, the complexity of application development is greatly reduced, thereby simplifying the job for application developers. Thus, the present invention provides a superior approach to data synchronization over the prior art.

It is appreciated that during the synchronization process of the present invention, when the modification flags and/or modification counts of data records are examined and compared, various combinations regarding the status of the modification flags and modification counts could be encountered. The above recited example is one of many possible scenarios and is intended as an illustration-rather than a limitation. It would be clear to a person of ordinary skill in the data processing and synchronization art, having thoroughly read the description of the various embodiments of the present invention presented herein, that the data synchronization technique described and variations thereof are applicable to such different scenarios.

In addition, certain of these scenarios may call for extra processing step(s) depending on the specific implementation of the database and/or underlying operating system. For instance, in an embodiment where the underlying operating system is the PalmOS, a so-called "double modify" scenario arises when a data record in one database and its counterpart in the other database both have the "modified" status for their modification flags. In such a case, it is a design choice or implementation decision as to how the data should be reconciled. Irrespective of the specific manner in which such special scenarios are handled, embodiments described herein, with appropriate adaptations, are capable of identifying such situations and performing the desired actions(s) (e.g., creating a log, generating an archive, handing the task over to another program for exception handling, etc.) without departing from the scope and spirit of the present invention.

Moreover, although embodiments of the present invention have been described as being practiced upon a hand-held computer such as a PDA, it should be appreciated that the present invention is not restricted thereto but rather can be practiced with numerous applications which require data to be synchronized among different databases and/or other data storage and archival means. Such alternative applications, though not specifically described in detail herein, are within the scope and spirit of the present invention.

The preferred embodiment of the present invention, a method and system that enables faster data synchronization between different databases, is thus described. While the present invention has been described in particular embodiments, it should be appreciated that the present invention should not be construed as limited by such embodiments, but rather construed according to the below claims.

What is claimed is:

1. A method for synchronizing data records between plural databases comprising the steps of:
    a) designating a first database as a source database and a second database as a target database;
    b) determining a state of a first modification flag and a second modification flag, said first modification flag contained in a first data record in said source database, said second modification flag contained in a first data record in said target database, wherein said first modification flag indicates that said first data record in said source database has been modified and wherein a value of said first modification flag, indicative of a particular event, is set upon an occurrence of said particular event, wherein said second modification flag indicates that said first data record in said target database has been modified and wherein a value of said second modification flag, indicative of a second particular event, is set upon an occurrence of said second particular event;
    c) provided that said first modification flag is set and said second modification flag is not set, propagating said first data record in said source database to said first data record in said target database;
    d) provided that said first modification flag is not set, comparing a first modification count contained in said first data record in said source database with a second modification count contained in said first data record in said target database, said first and second modification counts each being a value indicating how many times said first data record in said source database and said first data record in said target database has been modified respectively;
    e) provided that said first modification count has a higher value than said second modification count, propagating said first data record in said source database to said first data record in said target database, wherein said steps a) through e) can be completed without comparing raw data of said first data record and said corresponding data record;
    f) incrementing said second modification count to said high value of said first modification count;
    g) repeating said steps a) through f) until all of said data records in said source database have been processed: and
    h) re-designating said second database as said source database and said first database as said target database; and
    i) performing said steps a) through g) until all of said data records in said source database have been processed, wherein said step c) comprises the step of marking said first data record as deleted in said target database, provided that said first modification flag is set to indicate that said first data record has been deleted from said source database and that said first data record exists and is not already marked as deleted in said target database.

2. The method as recited in claim 1 wherein said step c) further comprises clearing said first modification flag.

3. The method as recited in claim 1 wherein said step c) comprises the steps of:
    creating a new data record in said target database according to said first data record in said source database, provided that said first modification flag is set to indicate that said first data record is new in said source database and that said first data record does not exist in said target database; and
    clearing said first modification flag.

4. The method as recited in claim 1 wherein said first database and said second database reside in different host systems.

5. The method as recited in claim 1 wherein said first database resides in a personal digital assistant (PDA).

6. The method as recited in claim 1 wherein said second database resides in a computer system to which a personal digital assistant (PDA) can be coupled via a cradle device.

7. A computer system comprising a processor coupled to a bus and a memory unit coupled to said bus, said memory unit having stored therein instructions that when executed implement a method for synchronizing data records between databases, said method comprising the steps of:
    a) designating a first database as a source database and a second database as a target database, said first database residing in said memory unit of said computer system;

b) determining a state of a first modification flag and a second modification flag, said first modification flag contained in a first data record in said source database, said second modification flag contained in a first data record in said target database, wherein said first modification flag indicates that said first data record in said source database has been modified and wherein a value of said first modification flag, indicative of a particular event, is set upon an occurrence of said particular event, wherein said second modification flag indicates that said first data record in said target database has been modified and wherein a value of said second modification flag, indicative of a second particular event, is set upon an occurrence of said second particular event;

c) provided that said first modification flag is set and said second modification flag is not set, propagating said first data record in said source database to said first data record in said target database;

d) provided that said first modification flag is not set, comparing a first modification count contained in said first data record in said source database with a second modification count contained in said first data record in said target database, said first and second modification counts each being a value indicating how many times said first data record in said source database and said first data record in said target database has been modified respectively;

e) provided that said first modification count has a higher value than said second modification count, propagating said first data record in said source database to said first data record in said target database, wherein said steps a) through e) can be completed without comparing raw data of said first data record and said corresponding data record;

f) incrementing said second modification count to said high value of said first modification count;

g) repeating steps a) through f) until all of said data records in said source database have been processed;

h) re-designating said second database as said source database and said first database as said target database; and i) performing said steps a) through g) until all of said data records in said source database have been processed, wherein said step c) of said method comprises the step of marking said first data record as deleted in said target database, provided that said first modification flag is set to indicate that said first data record has been deleted from said source database and that said first data record exists and is not already marked as deleted in said target database.

8. The computer system as recited in claim 7 wherein said step c) of said method further comprises clearing said first modification flag.

9. The computer system as recited in claim 7 wherein said step c) of said method comprises the steps of:

creating a new data record in said target database according to said first data record in said source database, provided that said first modification flag is set to indicate that said first data record is new in said source database and that said first data record does not exist in said target database; and clearing said first modification flag.

10. The computer system as recited in claim 7 wherein said second database does not reside in said computer system.

11. The computer system as recited in claim 7 wherein said computer system is a personal digital assistant (PDA).

12. The computer system as recited in claim 7 wherein said computer system is coupled to another computer system in which said second database resides.

13. A computer readable medium having embodied therein computer readable code for causing a computer system to implement a method for synchronizing data records between databases, said method comprising the steps of:

a) designating a first database as a source database and a second database as a target database;

b) determining a state of a first modification flag and a second modification flag, said first modification flag contained in a first data record in said source database, said second modification flag contained in a first data record in said target database, wherein said first modification flag indicates that said first data record in said source database has been modified and wherein a value of said first modification flag, indicative of a particular event, is set upon an occurrence of said particular event, wherein said second modification flag indicates that said first data record in said target database has been modified and wherein a value of said second modification flag, indicative of a second particular event, is set upon an occurrence of said second particular event;

c) provided that said first modification flag is set and said second modification flag is not set, propagating said first data record in said source database to said first data record in said target database;

d) provided that said first modification flag is not set, comparing a first modification count contained in said first data record in said source database with a second modification count contained in said first data record in said target database, said first and second modification counts each being a value indicating how many times said first data record in said source database and said first data record in said target database has been modified respectively;

e) provided that said first modification count has a higher value than said second modification count, propagating said first data record in said source database to said first data record in said target database, wherein said steps a) through e) can be completed without comparing raw data of said first data record and said corresponding data record;

f) incrementing said second modification count to said higher value of said first modification count;

g) repeating said steps a) through f) until all of said data records in said source database have been processed;

h) re-designating said second database as said source database and said first database as said target database; and i) performing steps a) through g) repeatedly until all of said data records in said source database have been processed, wherein said step c) of said method comprises the step of marking said first data record as deleted in said target database, provided that said first modification flag is set to indicate that said first data record has been deleted from said source database and that said first data record exists and is not already marked as deleted in said target database.

14. The computer readable medium as recited in claim 13 wherein said step c) of said method further comprises clearing said first modification flag.

15. The computer readable medium as recited in claim 13 wherein said step c) of said method comprises the steps of:
    creating a new data record in said target database according to said first data record in said source database, provided that said first modification flag is set to indicate that said first data record is new in said source database and that said first data record does not exist in said target database; and
    clearing said first modification flag.

16. The computer readable medium as recited in claim 13 wherein said first database and said second database reside in different host systems.

17. The computer readable medium as recited in claim 13 wherein said first database resides in a personal digital assistant (PDA).

18. The computer readable medium as recited in claim 13 wherein said second database resides in a computer system to which a personal digital assistant (PDA) can be coupled via a cradle device.

* * * * *